US012078507B2

(12) United States Patent
Armstrong et al.

(10) Patent No.: US 12,078,507 B2
(45) Date of Patent: Sep. 3, 2024

(54) ROUTE PLANNING FOR A GROUND VEHICLE THROUGH UNFAMILIAR TERRAIN

(71) Applicant: Insitu, Inc., Bingen, WA (US)

(72) Inventors: Kalani A. Armstrong, Alderley (AU); Andrew P. Lancaster, Alderley (AU)

(73) Assignee: Insitu, Inc., Bingen, WA (US)

( * ) Notice: Subject to any disclaimer, the term of this patent is extended or adjusted under 35 U.S.C. 154(b) by 254 days.

(21) Appl. No.: 17/454,632

(22) Filed: Nov. 12, 2021

(65) Prior Publication Data

US 2023/0152123 A1 May 18, 2023

(51) Int. Cl.
*G01C 21/00* (2006.01)
*G01C 21/34* (2006.01)
*G01S 17/89* (2020.01)
*G05D 1/00* (2006.01)

(52) U.S. Cl.
CPC ..... *G01C 21/3852* (2020.08); *G01C 21/3461* (2013.01); *G01C 21/3826* (2020.08); *G01S 17/89* (2013.01); *G05D 1/0276* (2013.01)

(58) Field of Classification Search
CPC ............ G01C 21/3852; G01C 21/3461; G01C 21/3826; G01C 21/387; G01C 21/20; G01C 21/32; G01C 21/3492; G01S 17/89; G05D 1/0276
See application file for complete search history.

(56) References Cited

U.S. PATENT DOCUMENTS 5,504,686 A * 4/1996 Lippitt ..................... G06F 30/18
  701/4
7,272,474 B1 * 9/2007 Stentz ...................... G01C 7/04
  701/28
8,005,657 B2 * 8/2011 Herman ................. G05B 17/02
  703/8
11,193,781 B2 * 12/2021 Madsen ................. G05D 1/027
11,370,115 B2 * 6/2022 Cohen .................... B25J 13/089
(Continued)

FOREIGN PATENT DOCUMENTS

EP       0655699 A1    5/1995

OTHER PUBLICATIONS

Delling, D. et al. Engineering Route Planning Algorithms. In: Lerner, J., Wagner, D., Zweig, K.A. (Eds.): Algorithmics of Large and Complex Networks, vol. 5515. Springer-Verlag, Berlin, Heidelburg, Germany, 2009. pp. 117-139.

*Primary Examiner* — Donald J Wallace
(74) *Attorney, Agent, or Firm* — Quinn IP Law

(57) ABSTRACT

A method is provided for supporting one or more ground vehicles on a mission that includes traversal of a ground region. The method includes accessing geospatial data produced from an aerial survey of the ground region, and performing an analysis of the geospatial data to produce terrain data that describes the ground region. The terrain data is weighted based on constraints of the one or more ground vehicles, and an order of priority of criteria of the mission. A map is constructed in which the ground region is expressed as a geospatially-mapped array of the weighted terrain data, and the map is searched for a path that meets the criteria of the mission. The path is described by a series of waypoints that define a route across the ground region, and an indication of the route is output for the one or more ground vehicles to traverse during the mission.

32 Claims, 14 Drawing Sheets

(56) References Cited

U.S. PATENT DOCUMENTS

| | | |
|---|---|---|
| 2005/0195096 A1 | 9/2005 | Ward et al. |
| 2018/0108175 A1* | 4/2018 | Liu .................... G01C 21/3826 |
| 2020/0348139 A1* | 11/2020 | Bitan ................... A61B 5/6893 |

* cited by examiner

ROUTE PLANNING FOR A GROUND VEHICLE THROUGH UNFAMILIAR TERRAIN

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of route planning, and in particular, route planning in unfamiliar terrain. Existing route planning techniques for unfamiliar terrain use manual techniques that either require pre-existing knowledge of the terrain, or the completion of ground reconnaissance. These techniques require manual waypoint selection and route generation which tend to be time-consuming and man-power intensive techniques.

Existing solutions to route planning may also use pre-existing base maps and satellite data to evaluate a path to traverse through a terrain. Problems arise with this technique for constantly evolving terrains (such as contested terrain, mine sites and construction sites) and where the pre-existing maps may be out of date and/or inaccurate.

Base maps/satellite data normally only consist of one data type (imagery) or are limited by their accuracy and resolution (low-accuracy and large-GSD imagery or terrain meshes). With the inability to rapidly deploy satellites for data collection, any route planning using this type of data is unreliable and ineffective when applied to unfamiliar evolving terrain. Current satellite data solutions tend to produce accuracy levels in the range of 3 to 30 meters. In comparison, data generated from a UAV has accuracy within 5 to 10 centimeters. This allows for more accurate terrain analysis evaluation, subsequently leading to more accurate and reliable route planning.

It would therefore be desirable to have a system and method that takes into account at least some of the issues discussed above, as well as other possible issues.

BRIEF SUMMARY

Example implementations of the present disclosure are directed to route planning for a ground vehicle through unfamiliar terrain. Example implementations allow a user to evaluate a strategic route through unfamiliar terrain, with optimized route planning that can be tailored to fleet specifications and mission priorities. Example implementations may be applied in a number of different use cases including unfamiliar contested terrain, evolving terrain (such as mine sites and construction sites), and the like. Example implementations may be extended to similar scenarios such as flee routes (avoid a specific area or line of sight) and multi-target routes (shortest route to cover a group of targets). Making use of frequent and efficient remote UAV data acquisition, example implementations may provide route planning through an area at a rapid frequency. This allows for rapid, accurate, and reliable information of unfamiliar contested terrain that previously was unable to be obtained without prior air/ground reconnaissance.

The present disclosure thus includes, without limitation, the following example implementations.

Some example implementations provide an apparatus for supporting one or more ground vehicles on a mission that includes traversal of a ground region, the apparatus comprising: a memory configured to store computer-readable program code; and processing circuitry configured to access the memory, and execute the computer-readable program code to cause the apparatus to at least: access geospatial data produced from an aerial survey of the ground region; perform an analysis of the geospatial data to produce terrain data that describes the ground region in terms of a plurality of terrain metrics; weight the terrain data based on constraints of the one or more ground vehicles, and an order of priority of criteria of the mission; construct a map of the ground region in which the ground region is expressed as a geospatially-mapped array of the terrain data as weighted; search the map for a path that meets the criteria of the mission, the path described by a series of waypoints that define a route across the ground region; and output an indication of the route for the one or more ground vehicles to traverse during the mission.

Some example implementations provide a method of supporting one or more ground vehicles on a mission that includes traversal of a ground region, the method comprising: accessing geospatial data produced from an aerial survey of the ground region; performing an analysis of the geospatial data to produce terrain data that describes the ground region in terms of a plurality of terrain metrics; weighting the terrain data based on constraints of the one or more ground vehicles, and an order of priority of criteria of the mission; constructing a map of the ground region in which the ground region is expressed as a geospatially-mapped array of the terrain data as weighted; searching the map for a path that meets the criteria of the mission, the path described by a series of waypoints that define a route across the ground region; and outputting an indication of the route for the one or more ground vehicles to traverse during the mission.

Some example implementations provide a computer-readable storage medium for supporting one or more ground vehicles on a mission that includes traversal of a ground region, the computer-readable storage medium being non-transitory and having computer-readable program code stored therein that, in response to execution by processing circuitry, causes an apparatus to at least: access geospatial data produced from an aerial survey of the ground region; perform an analysis of the geospatial data to produce terrain data that describes the ground region in terms of a plurality of terrain metrics; weight the terrain data based on constraints of the one or more ground vehicles, and an order of priority of criteria of the mission; construct a map of the ground region in which the ground region is expressed as a geospatially-mapped array of the terrain data as weighted; search the map for a path that meets the criteria of the mission, the path described by a series of waypoints that define a route across the ground region; and output an indication of the route for the one or more ground vehicles to traverse during the mission.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
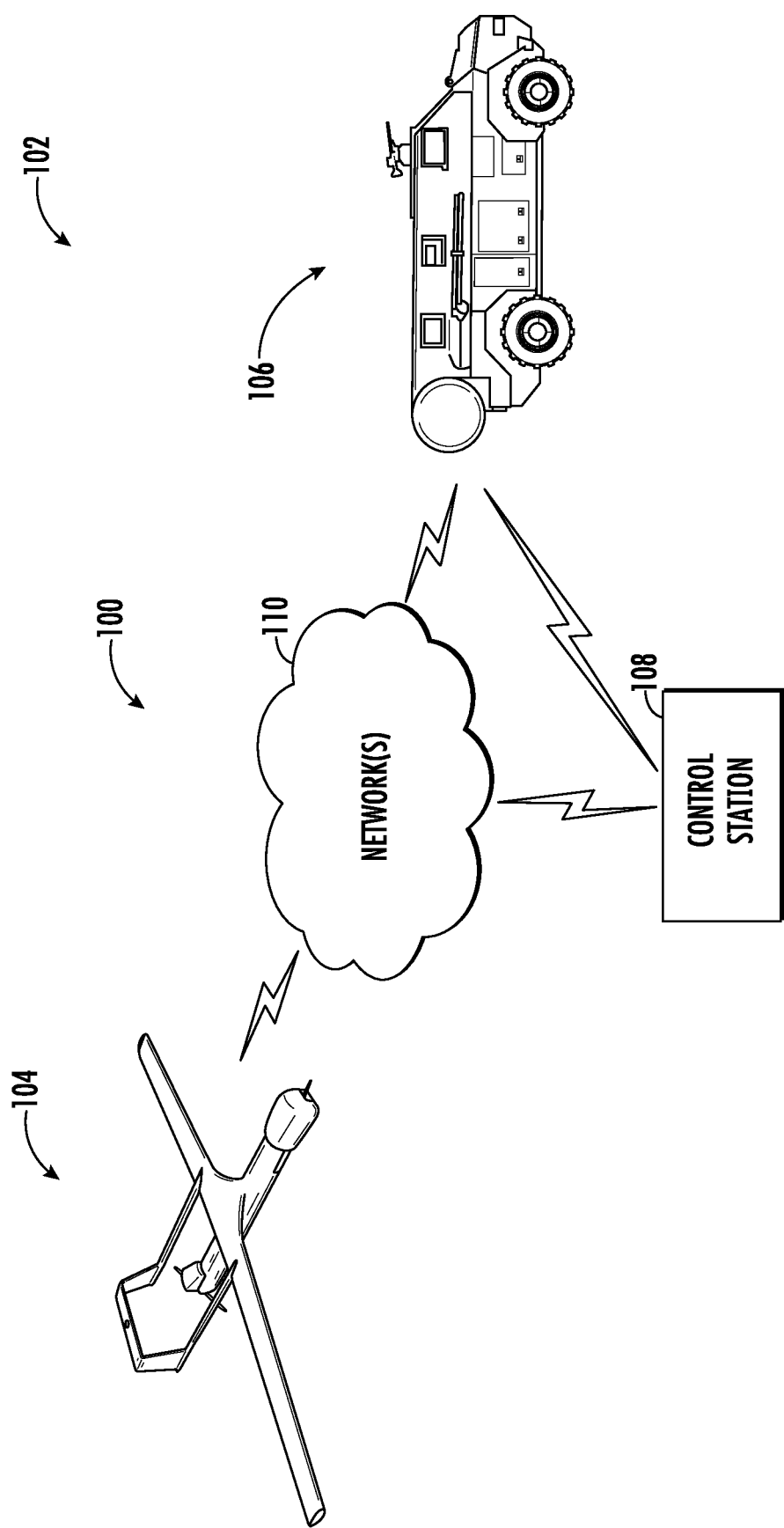
FIG. 1 illustrates a system according to some example implementations.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

A robot implemented as a vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more electric motors or engines configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the electric motors or engines to the propulsors. The electric motors/engines and drivetrain may in some contexts be referred to as the powertrain of the vehicle.

FIG. 1 illustrates a system 100 according to some example implementations of the present disclosure. The system may include any of a number of different subsystems (each an individual system) for performing one or more functions or operations. As shown, in some examples, the system includes one or more robots 102 that may be any of a number of different types of robots. In particular, as shown, the one or more robots may include an aerial vehicle 104 such as a UAV, and a ground vehicle 106 such as a UGV. It should be understood, however, that the system may additionally or alternatively include a number of other types of robots. These may include other types of robots implemented as vehicles, including those that may be manned or unmanned.

As also shown, the system 100 may include a control station 108. In this regard, the control station provides facilities for communication with or control of the one or more robots, such as by wired or wireless data links directly or across one or more networks 110. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

Figure 2:
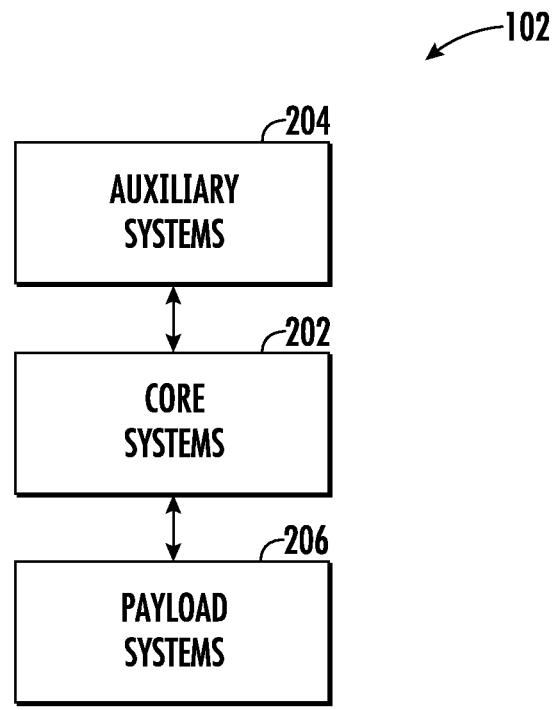
FIG. 2 illustrates high-level systems of a robot of the system of FIG. 1, according to some example implementations.

FIG. 2 further illustrates high-level systems of a robot 102 that may be implemented as an aerial vehicle 104, ground vehicle 106 or other type of robot, according to some example implementations. As shown, the robot includes core systems 202, auxiliary systems 204 and payload systems 206. The core systems include components that provide core functionality of the robot, such as controlled movement operations. For example, the core systems may include autopilot, one or more control servos, and one or more sensors such as avionic sensors in the case of an aerial robot like the aerial vehicle. The control servo(s) may include one or more servos for moving control surfaces of the robot. In the example where the robot is an aerial vehicle, the control surfaces may include ailerons, elevators of horizontal stabilizer, rudders, and flaps. The avionic sensor(s) may include one or more sensors for determining airspeed, pitch, pitch rate, roll, roll rate, yaw, yaw rate, acceleration, and/or inertial navigation. In other examples, the core systems may include more, fewer, and/or different components.

The auxiliary systems 204 may include components whose functionality is auxiliary to the core systems 202 and/or provide other functionality than core functionality for the robot 102. In a particular example of the aerial vehicle 104, the auxiliary systems may include sensors, computers and signals used for: fixing aircraft position other than inertial dead reckoning, aircraft navigation and anti-collision lighting systems, aircraft air traffic control (ATC) transponder, one or more command and control (C2) data links, health and status monitoring of aircraft equipment, propulsion systems (assumes control glide landing on battery power), and/or rejection of operator inputs that exceed safe limits.

The auxiliary systems 204 may include remote control interface, one or more lighting systems, and one or more transponders. Remote control interface may be used transmitting and/or receiving C2 communications, such as C2 messages and/or commands provided by a remote operator of the robot 102. For example, C2 messages and/or commands may be acted upon by the robot as control messages for remotely controlling the robot. The lighting system(s) may include one or more illumination sources for illuminating or lighting part or all of the robot. In an example where the robot is the aerial vehicle 104, the lighting system(s) may provide illumination for wings and other aspects of the aircraft. The transponder(s) may receive radio signals and automatically transmit different radio signals, such as one or more transponders for communicating with air traffic control systems. In other examples, the auxiliary systems may include more, fewer, and/or different components.

The payload systems 206 collectively may be carried by the robot 102 as a cargo or payload. For example, the payload systems may include payload devices, payload sensors, and payload communications. The payload devices may include one or more devices carried aboard the robot that are not core systems 202 or auxiliary systems 204. The payload sensor(s) may include one or more sensors configured to measure conditions in an environment around the robot and provide data about the measured conditions of the environment. The payload communications may include one or more devices used for communicating data and perhaps control messages with the payload systems; e.g., provide uplink and/or downlink data for communicating with the payload systems and perhaps other components of the robot. In other examples, the payload systems may include more, fewer, and/or different components.

The data provided by payload sensor(s) of the payload systems 206 may include meteorological conditions, including wind speed, wind direction, temperature, humidity, barometric pressure, and/or rainfall; location data including latitude, longitude, and/or altitude data; kinematic information (e.g., location, speed, velocity, acceleration data), one or more vehicles, and/or one or more aircraft, and electromagnetic radiation data (e.g., infra-red, ultra-violet, X-ray data). The payload sensor(s) may include one or more GPS sensors, location sensors, gyroscopes, accelerometers, magnetometers, video and/or still cameras/imaging systems, light sensors, infrared sensors, ultraviolet sensors, X-ray sensors, meteorological sensors, proximity sensors, vibration and/or motion sensors, heat sensors, thermometers, lasers, wind sensors, barometers, rain gauges, and microphones. In some examples, the payload sensor(s) may be utilized for relative position sensing, where relative position sensing provides information about aircraft velocity relative to a vehicle; e.g., using differential GPS and/or radio-based triangulation methods.

In a particular example of the aerial vehicle 104, the payload systems 206 may include equipment, signals and commands used for modular payloads not required for flight, including gimbals for positioning and stabilizing payloads, optical and infrared image capturing equipment, computers for payload stabilization, tracking algorithms and metadata tagging, transceivers for payload data link with systems not on the aircraft, transceivers for ground-to-ground or air-to-ground communications relay, and other data gathering electronic equipment.

Figure 3:
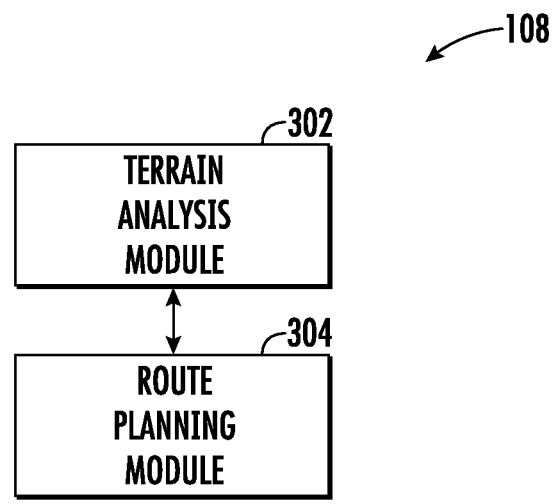
FIG. 3 illustrates high-level systems of a control station of the system of FIG. 1, according to some example implementations.

FIG. 3 further illustrates high-level systems of the control station 108, according to some example implementations of the present disclosure. As shown, for example, the control station may include a terrain analysis module 302 and a route planning module 304. Although shown as systems of the control station, it should be understood that either or both of the terrain analysis module or the route planning module may instead be implemented onboard a robot 102, such as the aerial vehicle 104, ground vehicle 106 or other type of robot.

According to some example implementations of the present disclosure, the terrain analysis module 302 is configured to access geospatial data produced from an aerial survey of the ground region, such as by the aerial vehicle 104. In this regard, the geospatial data may be accessed during a campaign in which the mission is planned, and the geospatial data is produced from the aerial survey that is performed contemporaneous with the campaign. The geospatial data may be represented in a number of different manners. In some examples, the geospatial data includes a point cloud of lidar data georegistered to the ground region and collected during the aerial survey. In the same or other examples, the geospatial data may include a raster image of the ground region, in which the raster image has a dot matrix data structure with multiple layers of spatially-coincident matrices of the geospatial data.

In some examples, the terrain analysis module 302 is configured to perform an analysis of the geospatial data to produce terrain data that describes the ground region in terms of a plurality of terrain metrics, such as multiple ones of elevation, roughness, slope, vegetation density, or viewshed from a point of interest. Other examples of suitable terrain metrics may include obstacles (artificial or natural), bodies of water, silhouetting, cover and concealment, avenues of approach/escape, distance to a point of interest, key terrain, decisive terrain, vantage points and the like. The terrain analysis module is configured to weight the terrain data based on constraints of one or more ground vehicles 106, and an order of priority of criteria of the mission, which may include for the one or more ground vehicles, multiple ones of traversability, speed, fuel efficiency, covertness, or wireless communication range. And the terrain analysis module may construct a map of the ground region in which the ground region is expressed as a geospatially-mapped array of the terrain data as weighted.

It will be appreciated that one or more of the criteria of the mission may impact the weighting of a number of terrain metrics. In this regard, terrain metrics such as slope, obstacles, vegetation density, bodies of water and the like may be weighted based on traversability. Similarly, terrain metrics such as vegetation density, silhouetting, cover and concealment, avenues of approach/escape, distance to a point of interest, key terrain, decisive terrain, vantage points and the like may be weighted based on covertness.

In some examples, the terrain data includes terrain datasets for respective ones of the plurality of terrain metrics (e.g., elevation, roughness, slope, vegetation density, viewshed). The terrain analysis module 302 may be configured to weight the terrain datasets, with different ones of the terrain datasets weighted differently based on the constraints of the one or more ground vehicles 106. The terrain analysis module may then aggregate the terrain datasets as weighted, and constructing the map from the terrain datasets as aggregated.

In some examples in which the geospatial data includes a raster image having a dot matrix data structure with multiple layers of spatially-coincident matrices of the geospatial data, the terrain analysis module 302 may be configured to perform the analysis on the multiple layers of spatially coincident matrices to produce the terrain data that includes terrain datasets for respective ones of the plurality of terrain metrics. In some further examples, the terrain data also has the dot matrix data structure with a second multiple layers of second spatially-coincident matrices of respective ones of the terrain datasets. The terrain analysis module may then weight the second spatially-coincident matrices and thereby the terrain data. And for the map, the terrain analysis module may construct a raster image of the ground region from the second spatially-coincident matrices as weighted.

Regardless of the exact manner in which the map is constructed by the terrain analysis module 302, the route planning module 304 is configured to search the map for a path that meets the criteria of the mission. This may include the route planning module configured to search the map to find the path that best meets the criteria according to the order of priority (e.g., traversability, speed, fuel efficiency, covertness, wireless communication on range). The route planning module is configured to output an indication of the route for the one or more ground vehicles 106 to traverse during the mission. In some examples, the path may be described by a series of waypoints that define a route across the ground region; and accordingly, the indication of the route may include the series of waypoints that define the route.

The route planning module 304 may be configured to search the map for a path in a number of different manners. In some examples, the route planning module is configured to use artificial intelligence (AI), machine learning (ML) or other advanced algorithms or techniques to avoid a need for manual waypoint selection and route generation techniques that are currently used for route planning through unfamiliar terrain. The route planning module may use trained models and automated data analysis allows for reduced user intervention and seamless rapid route detection. And terrain analysis by the terrain analysis module 302, using metrics such as vehicle constraints and mission criteria, may enable the route planning module to find a path and thereby a route that is both reliable and realistic for the mission.

The one or more ground vehicles 106 may then be caused to traverse the route as provided by the indication output by the route planning module 304. This may occur in a number of different manners. In some examples, the one or more ground vehicles may receive the indication of the route to traverse. In other examples, the control station 108 may generate commands according to the route, and the ground station may communicate the commands to the one or more ground vehicles to cause the one or more ground vehicles to traverse the route.

To further illustrate example implementations of the present disclosure, FIGS. 4-12 illustrate views of a graphical user interface (GUI) 400 that may be produced at the control station 108 to support one or more ground vehicles 106 on a mission that includes traveral of a ground region, according to some example implementations. The GUI may be produced by the terrain analysis module 302, the route planning module 304, or another module or software application at the control station. As shown, the GUI includes a number of graphical control elements to enable a user to interact with either or both of the terrain analysis module or the route planning module.

In particular, for example, the GUI 400 may include graphical control elements from which a mission is specified. These may include first and second graphical control elements 402, 404 from which an origin and destination are specified, and a third graphical control element 406 from which one or more points of interest (targets) may be specified to define perspective of a viewshed. The GUI may include a fourth graphcial control element 408 from which a profile (and thereby constraints) of the one or more ground vehicles for the mission, and a fifth graphical control element 410 to enable selection of a type of the mission. The GUI may further include sixth graphical control elements 412 from which criteria of the mission may be selected (and possibly limited), and from which the criteria may be arranged in an order of priority. And the GUI may include a window 414 in which a summary of the mission or plan may be displayed.

Figure 4:
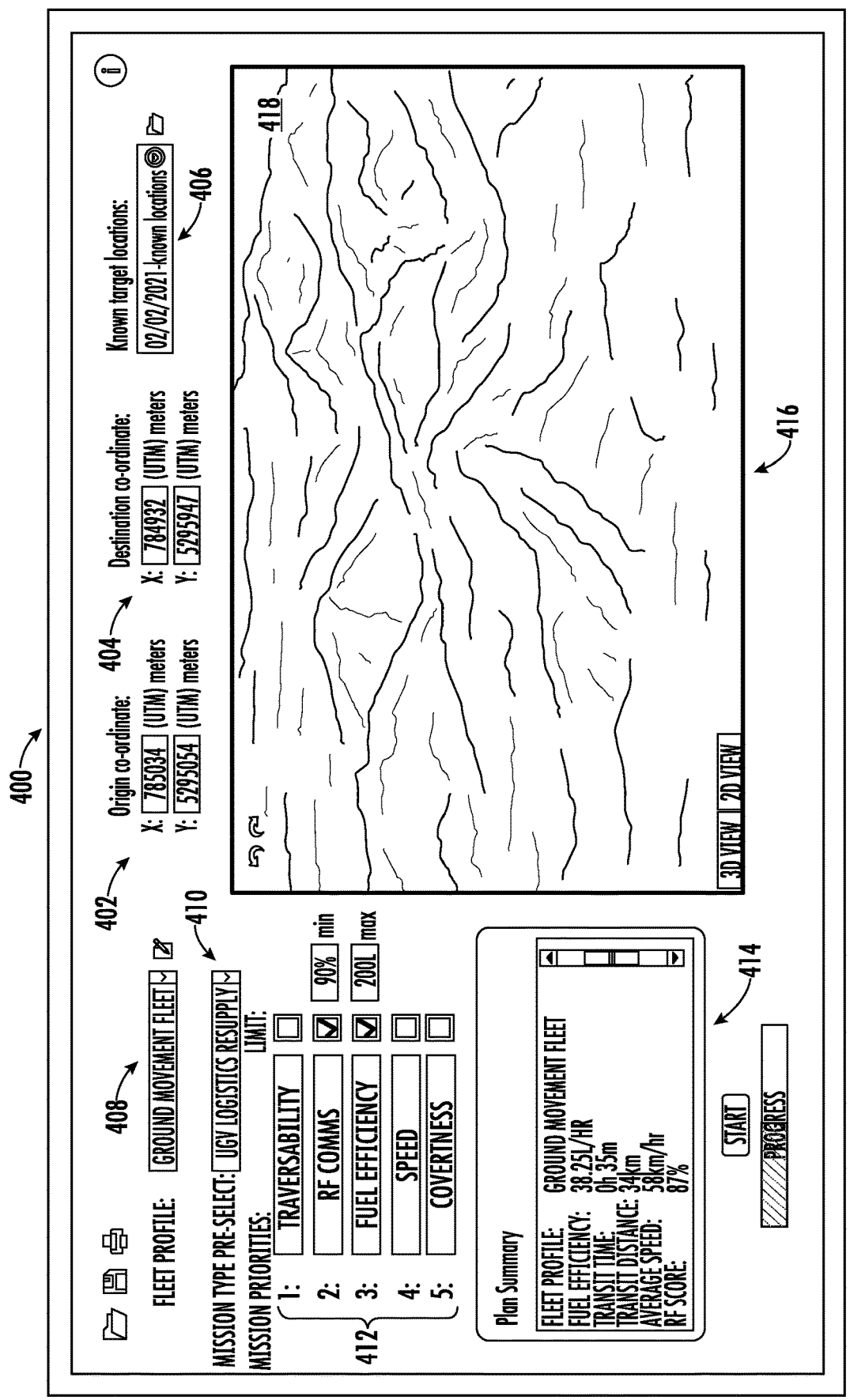
FIGS. 4, 5, 6, 7, 8, 9, 10, 11 and 12 illustrate views of a graphical user interface (GUI), according to some example implementations.
Figure 5:
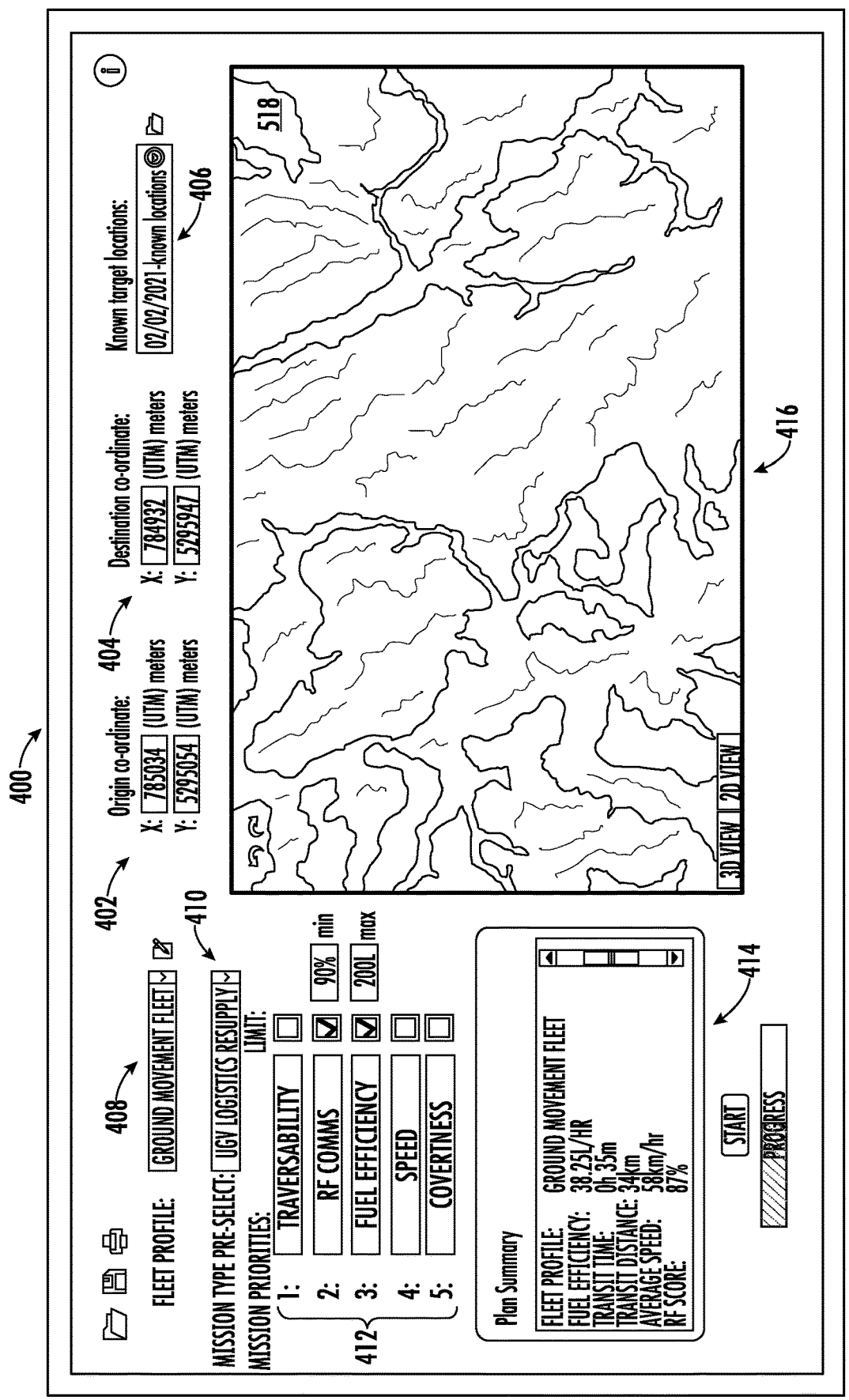

The GUI 400 further includes a window 416 in which one or more of geospatial data, terrain data or the route across the ground region are displayed. In FIGS. 4 and 5, the window includes a raster image of the ground region, formed from a point cloud of lidar data as described above. In FIG. 4, the raster image is presented in a three-dimensional (3D), map view 418; and in FIG. 5, the raster image is presented in a two-dimensional (3D), aerial view 518.

Figure 6:
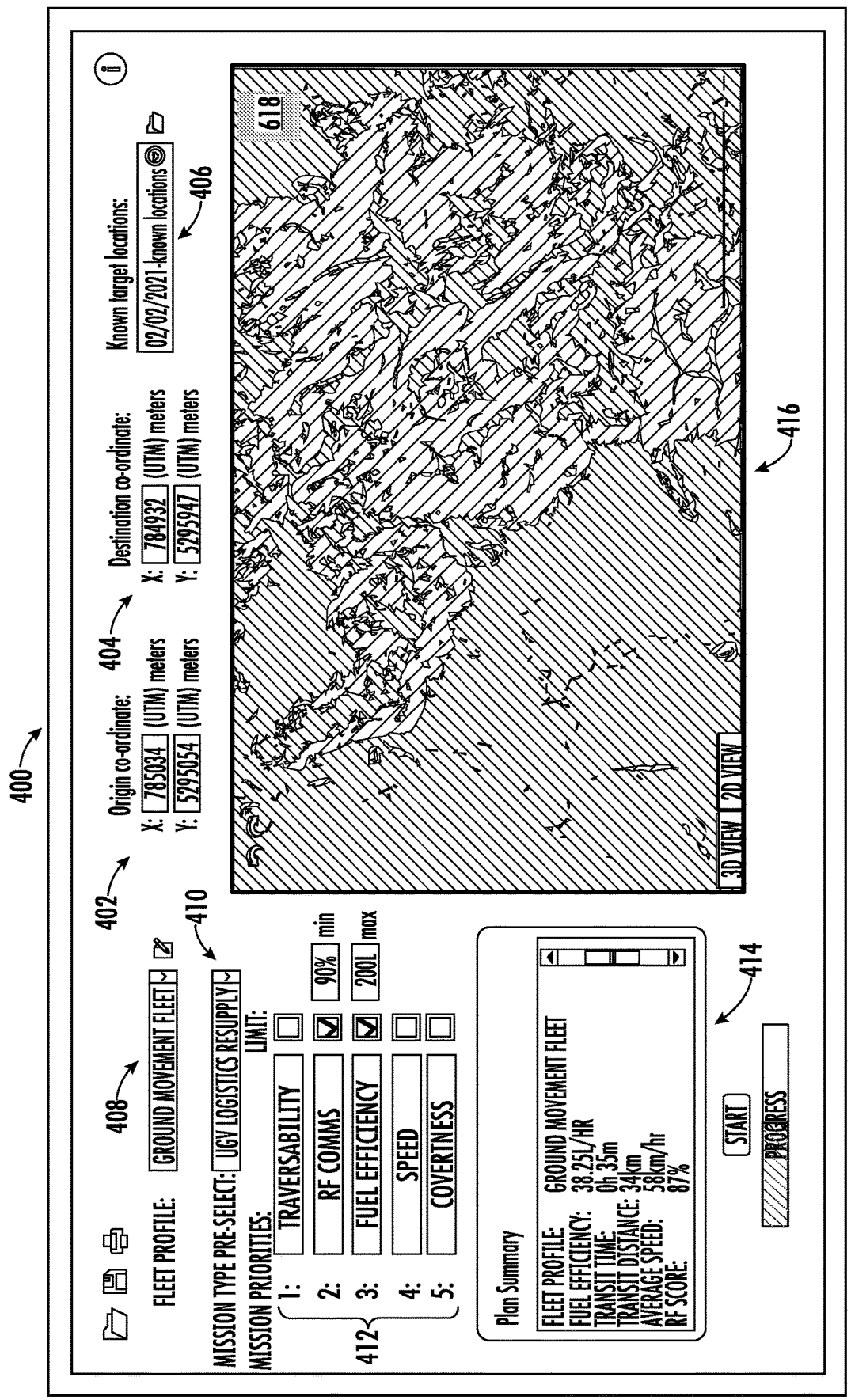
Figure 7:
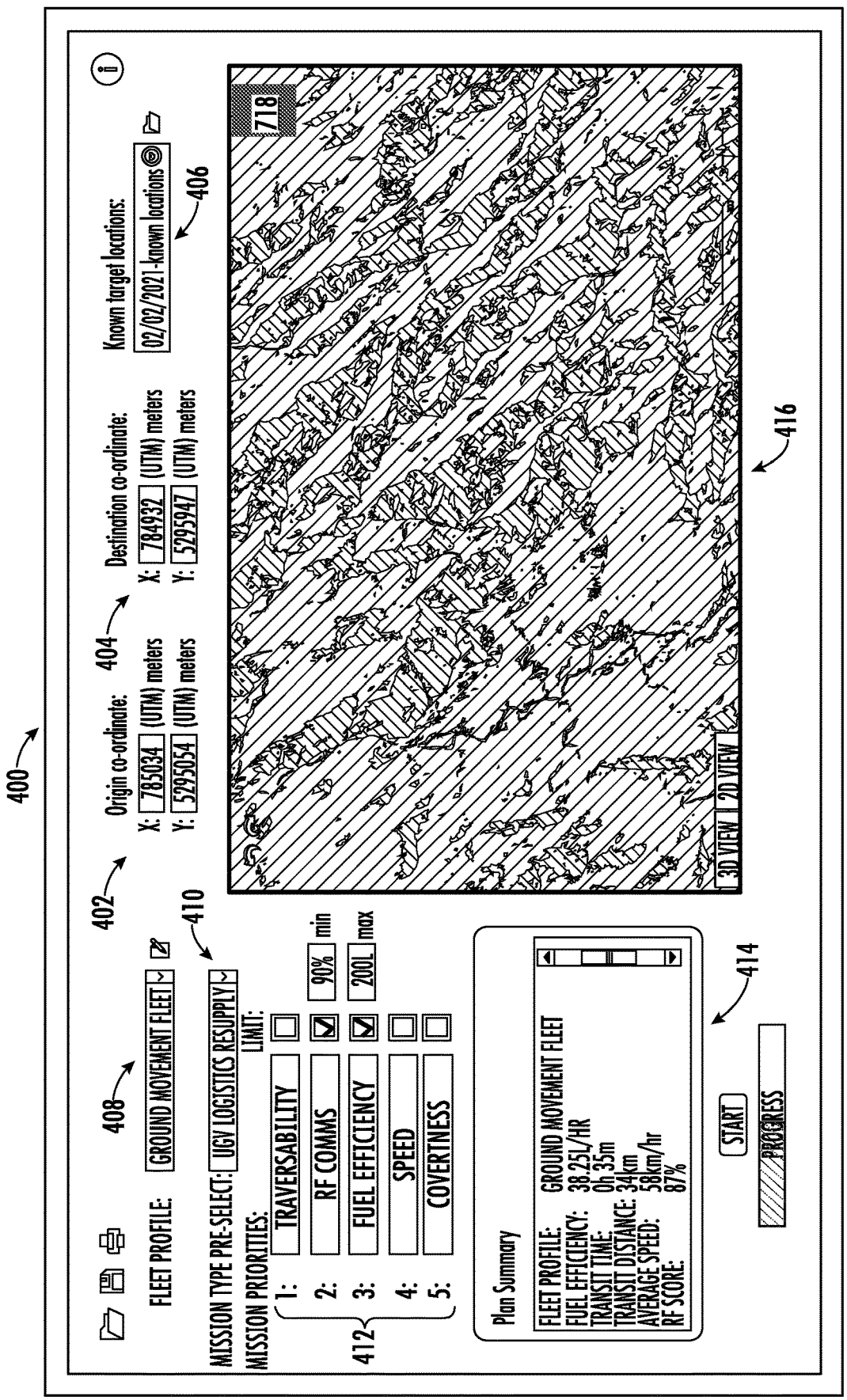
Figure 8:
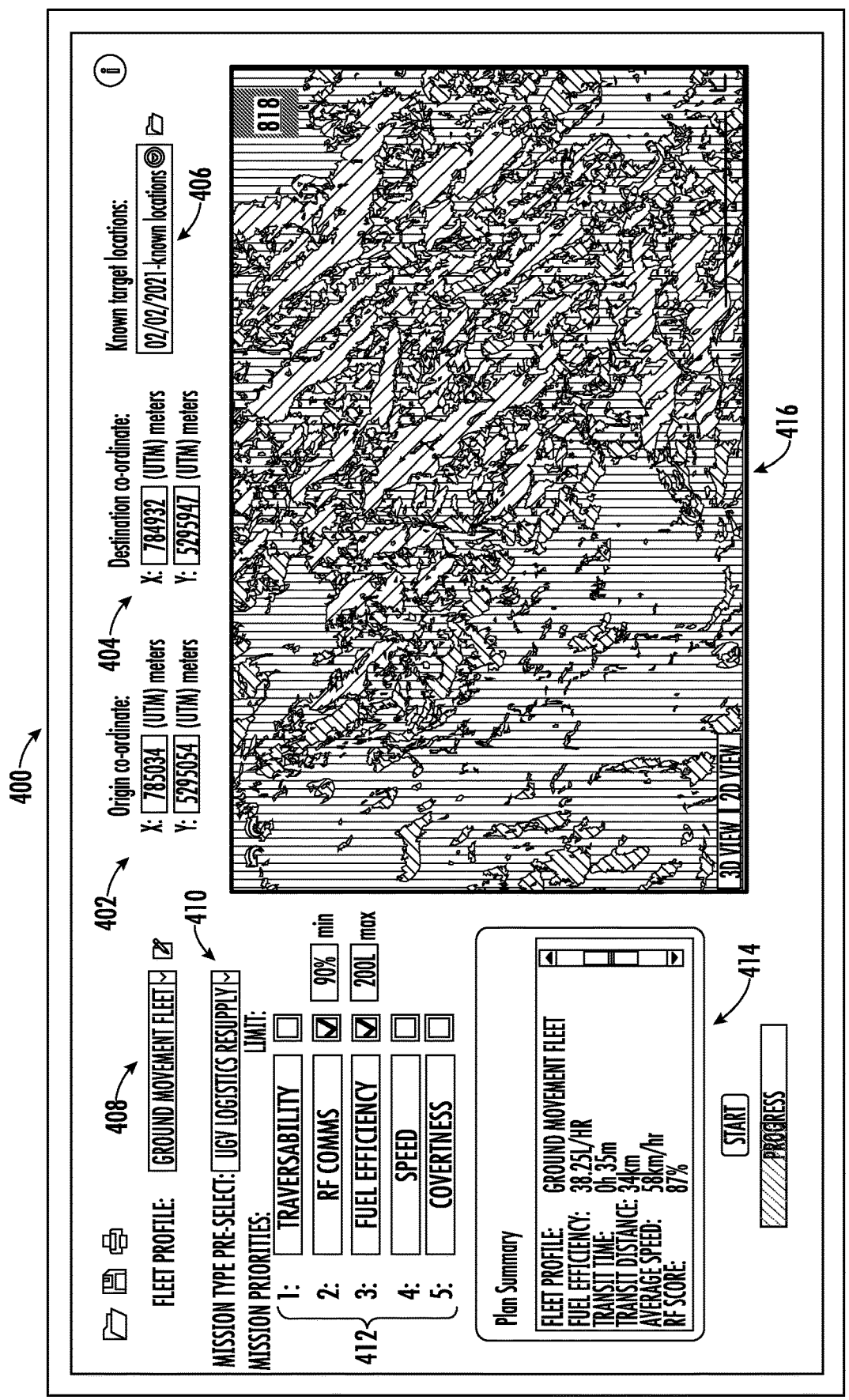

In FIGS. 6, 7 and 8, the window 416 includes terraing data that describes the ground region in terms of terrain metrics. In particular, in FIG. 6, the terrain data 618 in the window describes the ground region in terms of slope; and in FIG. 7, the terrain data 718 in the window describes the ground region in terms of viewshed from a point of interest. In FIG. 8, the terrain data 818 describes the ground region in terms of multiple terrain metrics that are aggregated.

Figure 9:
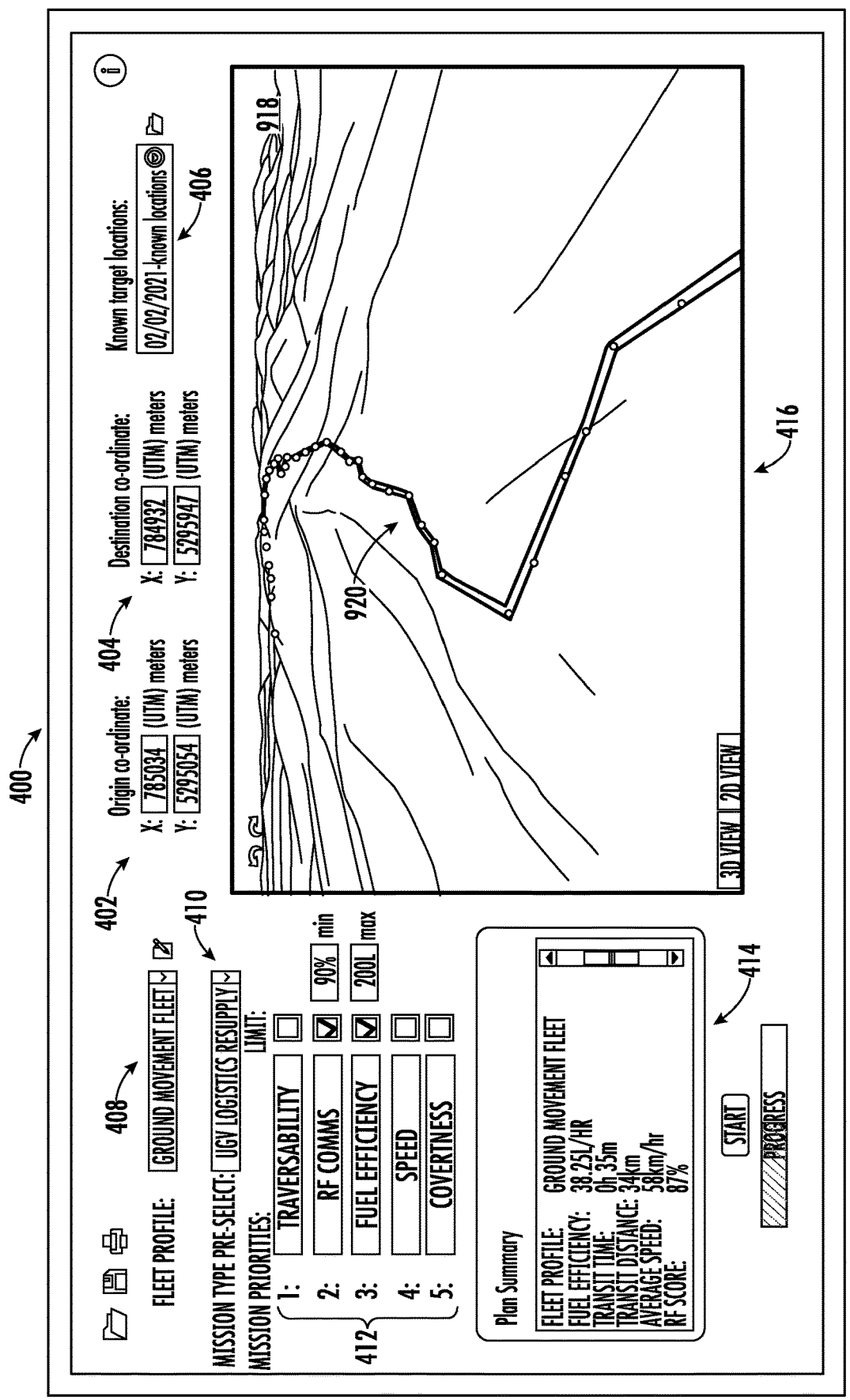
Figure 10:
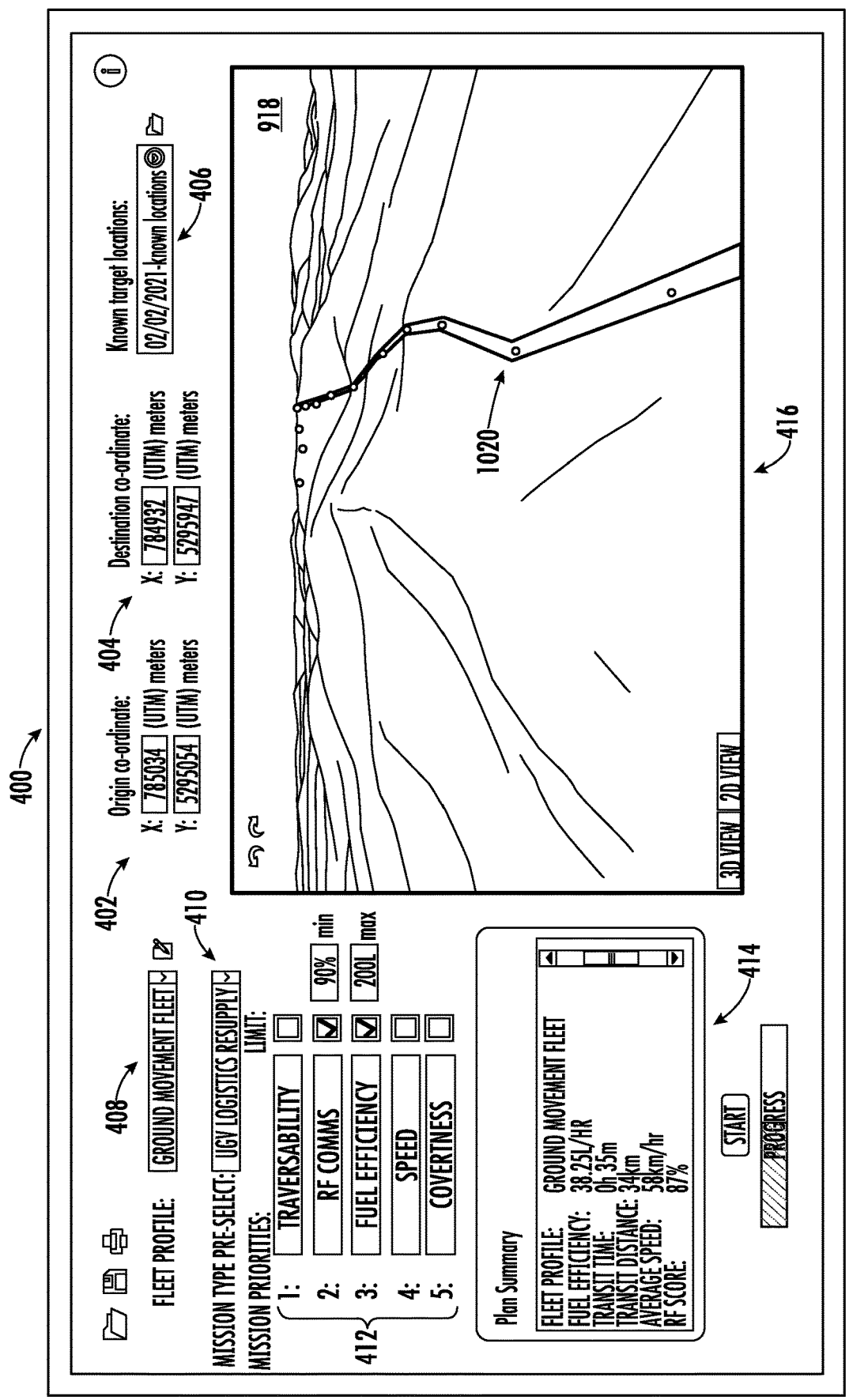
Figure 11:
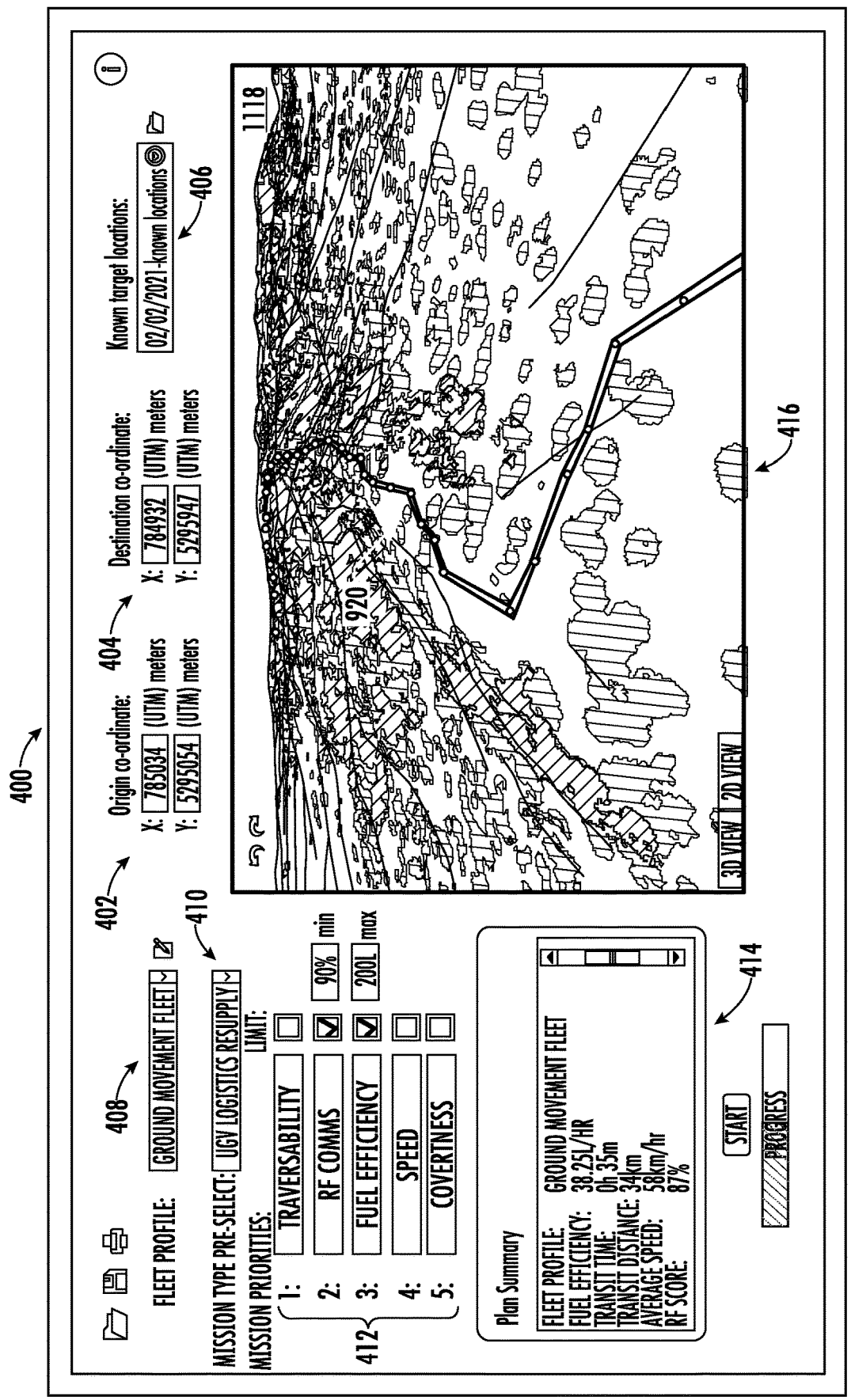
Figure 12:
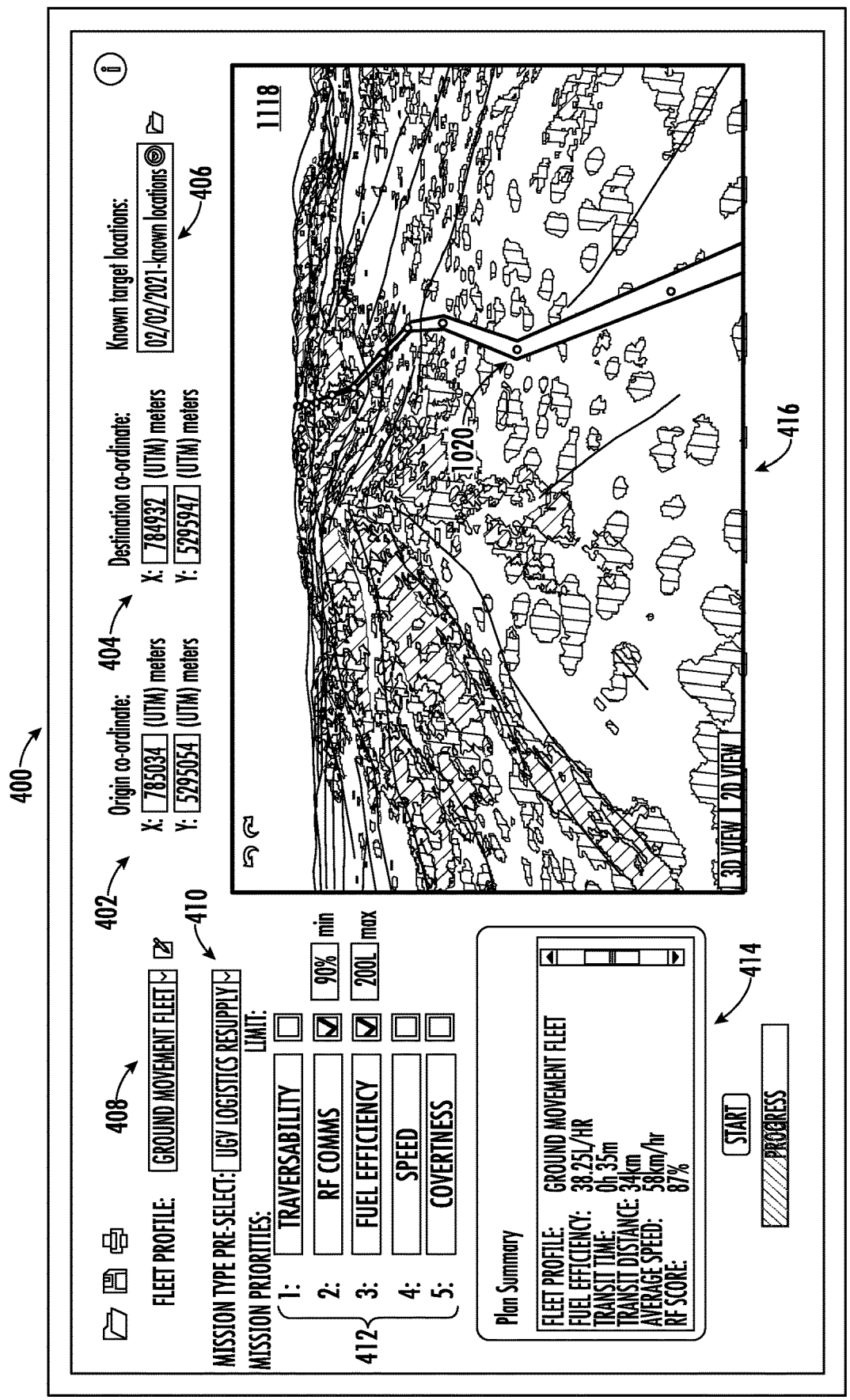

In FIGS. 9 and 10, the window 416 includes a map view 918 of a raster image of the ground region, and further includes respective routes 920, 1020 across the ground region for different orders of priority of criteria of the mission. In this regard, the route 920 in FIG. 9 prioritizes traversability over other criteria of the mission (as noted by the sixth graphical control elements 412). The route 1020 in FIG. 10 prioritizes speed over other criteria of the mission. The window in FIGS. 11 and 12 includes the same respective routes 920, 1020, but with a map view 1118 of the terrain data for multiple terrain metrics.

Figure 13A:
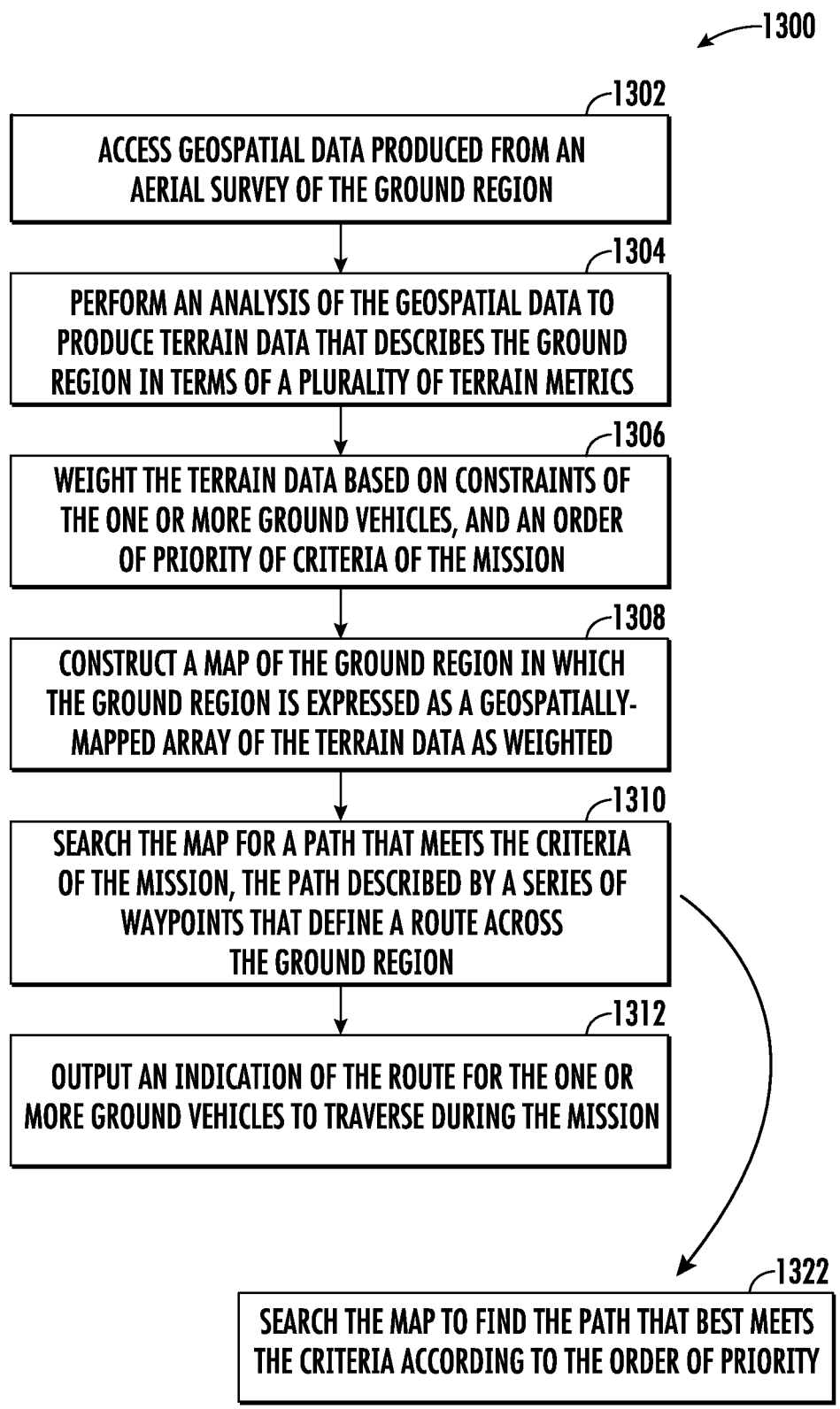
FIGS. 13A, 13B and 13C are flowcharts illustrating various steps in a method of supporting one or more ground vehicles on a mission, according to various example implementations.
Figure 13B:
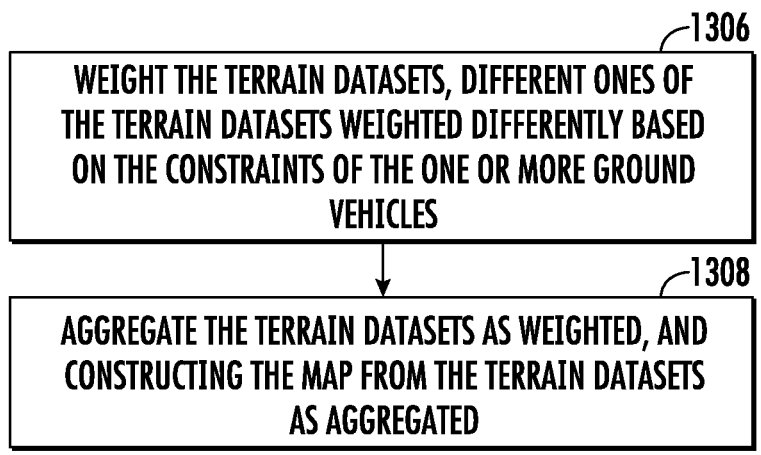
Figure 13C:
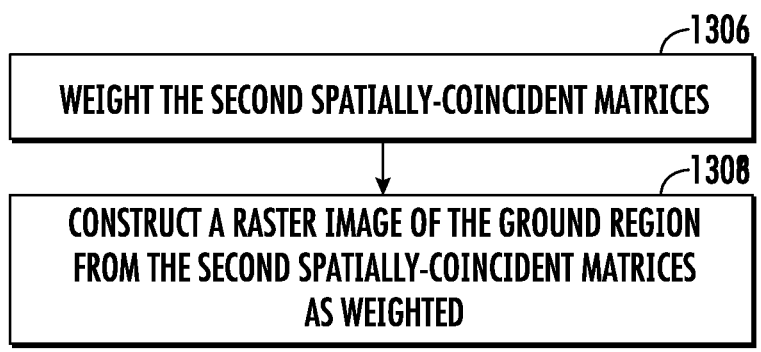

FIGS. 13A-13C are flowcharts illustrating various steps in a method 1300 of supporting one or more ground vehicles on a mission that includes traversal of a ground region, according to various example implementations of the present disclosure. The method includes accessing geospatial data produced from an aerial survey of the ground region, as shown at block 1302 of FIG. 13A. The method includes performing an analysis of the geospatial data to produce terrain data that describes the ground region in terms of a plurality of terrain metrics, as shown at block 1304. The method includes weighting the terrain data based on constraints of the one or more ground vehicles, and an order of priority of criteria of the mission, as shown at block 1306. The method includes constructing a map of the ground region in which the ground region is expressed as a geospatially-mapped array of the terrain data as weighted, as shown at block 1308. The method includes searching the map for a path that meets the criteria of the mission, the path described by a series of waypoints that define a route across the ground region, as shown at block 1310. And the method includes outputting an indication of the route for the one or more ground vehicles to traverse during the mission, as shown at block 1312.

In some examples, the geospatial data is accessed at block 1302 during a campaign in which the mission is planned, and the geospatial data is produced from the aerial survey that is performed contemporaneous with the campaign.

In some examples, the geospatial data that is produced from the aerial survey of the ground region includes a point cloud of lidar data georegistered to the ground region and collected during the aerial survey.

In some examples, the analysis is performed at block 1304 to produce the terrain data that describes the ground region in terms of the plurality of terrain metrics that include multiple ones of elevation, roughness, slope, vegetation density, or viewshed from a point of interest.

In some examples, the terrain data includes terrain datasets for respective ones of the plurality of terrain metrics, and weighting the terrain data at block 1306 includes weighting the terrain datasets, different ones of the terrain datasets weighted differently based on the constraints of the one or more ground vehicles, as shown at block 1314 of FIG. 13B. In some of these examples, constructing the map at block 1308 includes aggregating the terrain datasets as weighted, and constructing the map from the terrain datasets as aggregated, as shown at block 1316.

In some examples, the geospatial data includes is a raster image of the ground region, the raster image having a dot matrix data structure with multiple layers of spatially-coincident matrices of the geospatial data. In some of these examples, the analysis is performed at block 1304 on the multiple layers of spatially coincident matrices to produce the terrain data that includes terrain datasets for respective ones of the plurality of terrain metrics.

In some examples, the terrain data also has the dot matrix data structure with a second multiple layers of second spatially-coincident matrices of respective ones of the terrain datasets. In some of these examples, weighting the terrain data at block 1306 includes weighting the second spatially-coincident matrices, as shown at block 1318 of FIG. 13C. And in some of these examples, constructing the map at block 1308 includes constructing a raster image of the ground region from the second spatially-coincident matrices as weighted, as shown at block 1320.

In some examples, searching the map at block 1310 includes searching the map to find the path that best meets the criteria according to the order of priority, as shown at block 1322 of FIG. 13A.

In some examples, the terrain data is weighted at block 1306 based on the order of priority of criteria of the mission including for the one or more ground vehicles, multiple ones of traversability, speed, fuel efficiency, covertness, or wireless communication range.

According to example implementations of the present disclosure, the system 100 and its subsystems including the one or more robots 102 (aerial vehicle 104, ground vehicle 106) and control station 108 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. Some particular examples may include one or more apparatuses configured to function as or otherwise implement the control station and its subsystems including the terrain analysis module 302 and route planning module 304. In examples involving more than one apparatus, the respective apparatuses may be connected to or otherwise in communication with one another in a number of different manners, such as directly or indirectly via a wired or wireless network or the like.

Figure 14:
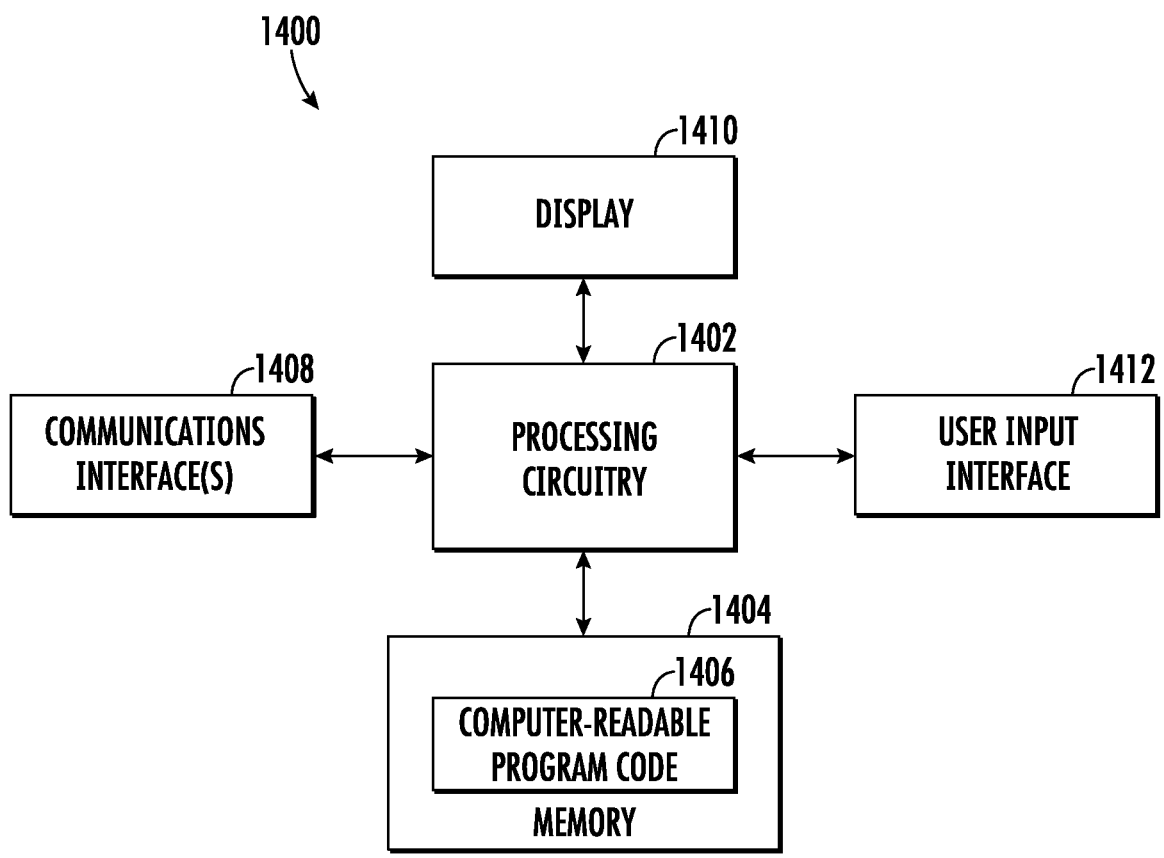
FIG. 14 illustrates an apparatus according to some example implementations.

FIG. 14 illustrates an apparatus 1400 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1402 (e.g., processor unit) connected to a memory 1404 (e.g., storage device).

The processing circuitry 1402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1404 (of the same or another apparatus).

The processing circuitry 1402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1404 is generally any piece of computer hardware that is capable of storing information such as, for example, data, computer programs (e.g., computer-readable program code 1406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1404, the processing circuitry 1402 may also be connected to one or more interfaces for displaying, transmitting and/or receiving information. The interfaces may include a communications interface 1408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1410 and/or one or more user input interfaces 1412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1400 may include a processing circuitry 1402 and a computer-readable storage medium or memory 1404 coupled to the processing circuitry, where the processing circuitry is configured to execute computer-readable program code 1406 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for supporting one or more ground vehicles on a mission that includes traversal of a ground region, the apparatus comprising: a memory configured to store computer-readable program code; and processing circuitry configured to access the memory, and execute the computer-readable program code to cause the apparatus to at least: access geospatial data produced from an aerial survey of the ground region; perform an analysis of the geospatial data to produce terrain data that describes the ground region in terms of a plurality of terrain metrics; weight the terrain data based on constraints of the one or more ground vehicles, and an order of priority of criteria of the mission; construct a map of the ground region in which the ground region is expressed as a geospatially-mapped array of the terrain data as weighted; search the map for a path that meets the criteria of the mission, the path described by a series of waypoints that define a route across the ground region; and output an indication of the route for the one or more ground vehicles to traverse during the mission.

Clause 2. The apparatus of clause 1, wherein the geospatial data is accessed during a campaign in which the mission is planned, and the geospatial data is produced from the aerial survey that is performed contemporaneous with the campaign.

Clause 3. The apparatus of clause 1 or clause 2, wherein the geospatial data that is produced from the aerial survey of the ground region includes a point cloud of lidar data georegistered to the ground region and collected during the aerial survey.

Clause 4. The apparatus of any of clauses 1 to 3, wherein the analysis is performed to produce the terrain data that describes the ground region in terms of the plurality of terrain metrics that include multiple ones of elevation, roughness, slope, vegetation density, or viewshed from a point of interest.

Clause 5. The apparatus of any of clauses 1 to 4, wherein the terrain data includes terrain datasets for respective ones of the plurality of terrain metrics, and the apparatus caused to weight the terrain data includes the apparatus caused to weight the terrain datasets, different ones of the terrain datasets weighted differently based on the constraints of the one or more ground vehicles, and wherein the apparatus caused to construct the map includes the apparatus caused to aggregate the terrain datasets as weighted, and construct the map from the terrain datasets as aggregated.

Clause 6. The apparatus of any of clauses 1 to 5, wherein the geospatial data includes is a raster image of the ground region, the raster image having a dot matrix data structure with multiple layers of spatially-coincident matrices of the geospatial data, and the analysis is performed on the multiple layers of spatially coincident matrices to produce the terrain data that includes terrain datasets for respective ones of the plurality of terrain metrics.

Clause 7. The apparatus of clause 6, wherein the terrain data also has the dot matrix data structure with a second multiple layers of second spatially-coincident matrices of respective ones of the terrain datasets, and wherein the apparatus caused to weight the terrain data includes the apparatus caused to weight the second spatially-coincident matrices, and the apparatus caused to construct the map includes the apparatus caused to construct a raster image of the ground region from the second spatially-coincident matrices as weighted.

Clause 8. The apparatus of any of clauses 1 to 7, wherein the apparatus caused to search the map includes the apparatus caused to search the map to find the path that best meets the criteria according to the order of priority.

Clause 9. The apparatus of any of clauses 1 to 8, wherein the terrain data is weighted based on the order of priority of criteria of the mission including for the one or more ground vehicles, multiple ones of traversability, speed, fuel efficiency, covertness, or wireless communication range.

Clause 10. A method of supporting one or more ground vehicles on a mission that includes traversal of a ground region, the method comprising: accessing geospatial data produced from an aerial survey of the ground region; performing an analysis of the geospatial data to produce terrain data that describes the ground region in terms of a plurality of terrain metrics; weighting the terrain data based on constraints of the one or more ground vehicles, and an order of priority of criteria of the mission; constructing a map of the ground region in which the ground region is expressed as a geospatially-mapped array of the terrain data as weighted; searching the map for a path that meets the criteria of the mission, the path described by a series of waypoints that define a route across the ground region; and outputting an indication of the route for the one or more ground vehicles to traverse during the mission.

Clause 11. The method of clause 10, wherein the geospatial data is accessed during a campaign in which the mission is planned, and the geospatial data is produced from the aerial survey that is performed contemporaneous with the campaign.

Clause 12. The method of clause 10 or clause 11, wherein the geospatial data that is produced from the aerial survey of the ground region includes a point cloud of lidar data georegistered to the ground region and collected during the aerial survey.

Clause 13. The method of any of clauses 10 to 12, wherein the analysis is performed to produce the terrain data that describes the ground region in terms of the plurality of terrain metrics that include multiple ones of elevation, roughness, slope, vegetation density, or viewshed from a point of interest.

Clause 14. The method of any of clauses 10 to 13, wherein the terrain data includes terrain datasets for respective ones of the plurality of terrain metrics, and weighting the terrain data includes weighting the terrain datasets, different ones of the terrain datasets weighted differently based on the constraints of the one or more ground vehicles, and wherein constructing the map includes aggregating the terrain datasets as weighted, and constructing the map from the terrain datasets as aggregated.

Clause 15. The method of any of clauses 10 to 14, wherein the geospatial data includes is a raster image of the ground region, the raster image having a dot matrix data structure with multiple layers of spatially-coincident matrices of the geospatial data, and the analysis is performed on the multiple layers of spatially coincident matrices to produce the terrain data that includes terrain datasets for respective ones of the plurality of terrain metrics.

Clause 16. The method of clause 15, wherein the terrain data also has the dot matrix data structure with a second multiple layers of second spatially-coincident matrices of respective ones of the terrain datasets, and wherein weighting the terrain data includes weighting the second spatially-coincident matrices, and constructing the map includes constructing a raster image of the ground region from the second spatially-coincident matrices as weighted.

Clause 17. The method of any of clauses 10 to 16, wherein searching the map includes searching the map to find the path that best meets the criteria according to the order of priority.

Clause 18. The method of any of clauses 10 to 17, wherein the terrain data is weighted based on the order of priority of criteria of the mission including for the one or more ground vehicles, multiple ones of traversability, speed, fuel efficiency, covertness, or wireless communication range.

Clause 19. A computer-readable storage medium for supporting one or more ground vehicles on a mission that includes traversal of a ground region, the computer-readable storage medium being non-transitory and having computer-readable program code stored therein that, in response to execution by processing circuitry, causes an apparatus to at least: access geospatial data produced from an aerial survey of the ground region; perform an analysis of the geospatial data to produce terrain data that describes the ground region in terms of a plurality of terrain metrics; weight the terrain data based on constraints of the one or more ground vehicles, and an order of priority of criteria of the mission; construct a map of the ground region in which the ground region is expressed as a geospatially-mapped array of the terrain data as weighted; search the map for a path that meets the criteria of the mission, the path described by a series of waypoints that define a route across the ground region; and output an indication of the route for the one or more ground vehicles to traverse during the mission.

Clause 20. The computer-readable storage medium of clause 19, wherein the geospatial data is accessed during a campaign in which the mission is planned, and the geospatial data is produced from the aerial survey that is performed contemporaneous with the campaign.

Clause 21. The computer-readable storage medium of clause 19 or clause 20, wherein the geospatial data that is produced from the aerial survey of the ground region includes a point cloud of lidar data georegistered to the ground region and collected during the aerial survey.

Clause 22. The computer-readable storage medium of any of clauses 19 to 21, wherein the analysis is performed to produce the terrain data that describes the ground region in terms of the plurality of terrain metrics that include multiple ones of elevation, roughness, slope, vegetation density, or viewshed from a point of interest.

Clause 23. The computer-readable storage medium of any of clauses 19 to 22, wherein the terrain data includes terrain datasets for respective ones of the plurality of terrain metrics, and the apparatus caused to weight the terrain data includes the apparatus caused to weight the terrain datasets, different ones of the terrain datasets weighted differently based on the constraints of the one or more ground vehicles, and wherein the apparatus caused to construct the map includes the apparatus caused to aggregate the terrain datasets as weighted, and construct the map from the terrain datasets as aggregated.

Clause 24. The computer-readable storage medium of any of clauses 19 to 23, wherein the geospatial data includes is a raster image of the ground region, the raster image having a dot matrix data structure with multiple layers of spatially-coincident matrices of the geospatial data, and the analysis is performed on the multiple layers of spatially coincident matrices to produce the terrain data that includes terrain datasets for respective ones of the plurality of terrain metrics.

Clause 25. The computer-readable storage medium of clause 24, wherein the terrain data also has the dot matrix data structure with a second multiple layers of second spatially-coincident matrices of respective ones of the terrain datasets, and wherein the apparatus caused to weight the terrain data includes the apparatus caused to weight the second spatially-coincident matrices, and the apparatus caused to construct the map includes the apparatus caused to construct a raster image of the ground region from the second spatially-coincident matrices as weighted.

Clause 26. The computer-readable storage medium of any of clauses 19 to 25, wherein the apparatus caused to search the map includes the apparatus caused to search the map to find the path that best meets the criteria according to the order of priority.

Clause 27. The computer-readable storage medium of any of clauses 19 to 26, wherein the terrain data is weighted based on the order of priority of criteria of the mission including for the one or more ground vehicles, multiple ones of traversability, speed, fuel efficiency, covertness, or wireless communication range.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting one or more ground vehicles on a mission that includes traversal of a ground region, the apparatus comprising:
   a memory configured to store computer-readable program code; and
   processing circuitry configured to access the memory, and execute the computer-readable program code to cause the apparatus to at least:
   access geospatial data produced from an aerial survey of the ground region, wherein the geospatial data includes is a raster image of the ground region, the raster image having a dot matrix data structure with multiple layers of spatially-coincident matrices of the geospatial data;
   perform an analysis of the geospatial data to produce terrain data that describes the ground region in terms of a plurality of terrain metrics;
   weight the terrain data based on constraints of the one or more ground vehicles, and an order of priority of criteria of the mission;
   construct a map of the ground region in which the ground region is expressed as a geospatially-mapped array of the terrain data as weighted;
   search the map for a path that meets the criteria of the mission, the path described by a series of waypoints that define a route across the ground region; and
   output an indication of the route for the one or more ground vehicles to traverse during the mission.

2. The apparatus of claim 1, wherein the geospatial data is accessed during a campaign in which the mission is planned, and the geospatial data is produced from the aerial survey that is performed contemporaneous with the campaign.

3. The apparatus of claim 1, wherein the geospatial data that is produced from the aerial survey of the ground region includes a point cloud of lidar data georegistered to the ground region and collected during the aerial survey.

4. The apparatus of claim 1, wherein the analysis is performed to produce the terrain data that describes the ground region in terms of the plurality of terrain metrics that include multiple ones of elevation, roughness, slope, vegetation density, or viewshed from a point of interest.

5. The apparatus of claim 1, wherein the terrain data includes terrain datasets for respective ones of the plurality of terrain metrics, and the apparatus caused to weight the terrain data includes the apparatus caused to weight the terrain datasets, different ones of the terrain datasets weighted differently based on the constraints of the one or more ground vehicles, and
wherein the apparatus caused to construct the map includes the apparatus caused to aggregate the terrain datasets as weighted, and construct the map from the terrain datasets as aggregated.

6. The apparatus of claim 1, wherein the analysis is performed on the multiple layers of spatially coincident matrices to produce the terrain data that includes terrain datasets for respective ones of the plurality of terrain metrics.

7. The apparatus of claim 1, wherein the terrain data also has the dot matrix data structure with a second multiple layers of second spatially-coincident matrices of respective ones of terrain datasets of the terrain data, and
wherein the apparatus caused to weight the terrain data includes the apparatus caused to weight the second spatially-coincident matrices, and the apparatus caused to construct the map includes the apparatus caused to construct a raster image of the ground region from the second spatially-coincident matrices as weighted.

8. The apparatus of claim 1, wherein the apparatus caused to search the map includes the apparatus caused to search the map to find the path that best meets the criteria according to the order of priority.

9. The apparatus of claim 1, wherein the terrain data is weighted based on the order of priority of criteria of the mission including for the one or more ground vehicles, multiple ones of traversability, speed, fuel efficiency, covertness, or wireless communication range.

10. A method of supporting one or more ground vehicles on a mission that includes traversal of a ground region, the method comprising:
accessing geospatial data produced from an aerial survey of the ground region;
performing an analysis of the geospatial data to produce terrain data that describes the ground region in terms of a plurality of terrain metrics;
weighting the terrain data based on constraints of the one or more ground vehicles, and an order of priority of criteria of the mission;
constructing a map of the ground region in which the ground region is expressed as a geospatially-mapped array of the terrain data as weighted;
searching the map for a path that meets the criteria of the mission, the path described by a series of waypoints that define a route across the ground region; and
outputting an indication of the route for the one or more ground vehicles to traverse during the mission;
wherein the geospatial data includes a raster image of the ground region, the raster image having a dot matrix data structure with multiple layers of spatially-coincident matrices of the geospatial data, and the analysis is performed on the multiple layers of spatially coincident matrices to produce the terrain data that includes terrain datasets for respective ones of the plurality of terrain metrics.

11. The method of claim 10, wherein the geospatial data is accessed during a campaign in which the mission is planned, and the geospatial data is produced from the aerial survey that is performed contemporaneous with the campaign.

12. The method of claim 10, wherein the geospatial data that is produced from the aerial survey of the ground region includes a point cloud of lidar data georegistered to the ground region and collected during the aerial survey.

13. The method of claim 10, wherein the analysis is performed to produce the terrain data that describes the ground region in terms of the plurality of terrain metrics that include multiple ones of elevation, roughness, slope, vegetation density, or viewshed from a point of interest.

14. The method of claim 10, wherein weighting the terrain data includes weighting the terrain datasets, different ones of the terrain datasets weighted differently based on the constraints of the one or more ground vehicles, and
wherein constructing the map includes aggregating the terrain datasets as weighted, and constructing the map from the terrain datasets as aggregated.

15. The method of claim 10, wherein the terrain data also has the dot matrix data structure with a second multiple layers of second spatially-coincident matrices of respective ones of the terrain datasets, and
wherein weighting the terrain data includes weighting the second spatially-coincident matrices, and constructing the map includes constructing a raster image of the ground region from the second spatially-coincident matrices as weighted.

16. The method of claim 10, wherein searching the map includes searching the map to find the path that best meets the criteria according to the order of priority.

17. The method of claim 10, wherein the terrain data is weighted based on the order of priority of criteria of the mission including for the one or more ground vehicles, multiple ones of traversability, speed, fuel efficiency, covertness, or wireless communication range.

18. A computer-readable storage medium for supporting one or more ground vehicles on a mission that includes traversal of a ground region, the computer-readable storage medium being non-transitory and having computer-readable program code stored therein that, in response to execution by processing circuitry, causes an apparatus to at least:
access geospatial data produced from an aerial survey of the ground region;
perform an analysis of the geospatial data to produce terrain data that describes the ground region in terms of a plurality of terrain metrics;
weight the terrain data based on constraints of the one or more ground vehicles, and an order of priority of criteria of the mission;
construct a map of the ground region in which the ground region is expressed as a geospatially-mapped array of the terrain data as weighted;

search the map for a path that meets the criteria of the mission, the path described by a series of waypoints that define a route across the ground region; and output an indication of the route for the one or more ground vehicles to traverse during the mission;

wherein the terrain data includes terrain datasets for respective ones of the plurality of terrain metrics, and the apparatus caused to weight the terrain data includes the apparatus caused to weight the terrain datasets, different ones of the terrain datasets weighted differently based on the constraints of the one or more ground vehicles, and wherein the apparatus caused to construct the map includes the apparatus caused to aggregate the terrain datasets as weighted, and construct the map from the terrain datasets as aggregated.

19. The computer-readable storage medium of claim 18, wherein the geospatial data is accessed during a campaign in which the mission is planned, and the geospatial data is produced from the aerial survey that is performed contemporaneous with the campaign.

20. The computer-readable storage medium of claim 18, wherein the geospatial data that is produced from the aerial survey of the ground region includes a point cloud of lidar data georegistered to the ground region and collected during the aerial survey.

21. The computer-readable storage medium of claim 18, wherein the analysis is performed to produce the terrain data that describes the ground region in terms of the plurality of terrain metrics that include multiple ones of elevation, roughness, slope, vegetation density, or viewshed from a point of interest.

22. The computer-readable storage medium of claim 18, wherein the geospatial data includes a raster image of the ground region, the raster image having a dot matrix data structure with multiple layers of spatially-coincident matrices of the geospatial data, and the analysis is performed on the multiple layers of spatially coincident matrices to produce the terrain data that includes the terrain datasets for respective ones of the plurality of terrain metrics.

23. The computer-readable storage medium of claim 22, wherein the terrain data also has the dot matrix data structure with a second multiple layers of second spatially-coincident matrices of respective ones of the terrain datasets, and wherein the apparatus caused to weight the terrain data includes the apparatus caused to weight the second spatially-coincident matrices, and the apparatus caused to construct the map includes the apparatus caused to construct a raster image of the ground region from the second spatially-coincident matrices as weighted.

24. The computer-readable storage medium of claim 18, wherein the apparatus caused to search the map includes the apparatus caused to search the map to find the path that best meets the criteria according to the order of priority.

25. The computer-readable storage medium of claim 18, wherein the terrain data is weighted based on the order of priority of criteria of the mission including for the one or more ground vehicles, multiple ones of traversability, speed, fuel efficiency, covertness, or wireless communication range.

26. An apparatus for supporting one or more ground vehicles on a mission that includes traversal of a ground region, the apparatus comprising:

a memory configured to store computer-readable program code; and processing circuitry configured to access the memory, and execute the computer-readable program code to cause the apparatus to at least:

access geospatial data produced from an aerial survey of the ground region;

perform an analysis of the geospatial data to produce terrain data that describes the ground region in terms of a plurality of terrain metrics;

weight the terrain data based on constraints of the one or more ground vehicles, and an order of priority of criteria of the mission;

construct a map of the ground region in which the ground region is expressed as a geospatially-mapped array of the terrain data as weighted;

search the map for a path that meets the criteria of the mission, the path described by a series of waypoints that define a route across the ground region; and output an indication of the route for the one or more ground vehicles to traverse during the mission;

wherein the terrain data includes terrain datasets for respective ones of the plurality of terrain metrics, and the apparatus caused to weight the terrain data includes the apparatus caused to weight the terrain datasets, different ones of the terrain datasets weighted differently based on the constraints of the one or more ground vehicles.

27. The apparatus of claim 26, wherein the apparatus caused to construct the map includes the apparatus caused to aggregate the terrain datasets as weighted, and construct the map from the terrain datasets as aggregated.

28. The apparatus of claim 26, wherein the geospatial data is accessed during a campaign in which the mission is planned, and the geospatial data is produced from the aerial survey that is performed contemporaneous with the campaign.

29. The apparatus of claim 26, wherein the geospatial data that is produced from the aerial survey of the ground region includes a point cloud of lidar data georegistered to the ground region and collected during the aerial survey.

30. The apparatus of claim 26, wherein the analysis is performed to produce the terrain data that describes the ground region in terms of the plurality of terrain metrics that include multiple ones of elevation, roughness, slope, vegetation density, or viewshed from a point of interest.

31. The apparatus of claim 26, wherein the apparatus caused to search the map includes the apparatus caused to search the map to find the path that best meets the criteria according to the order of priority.

32. The apparatus of claim 26, wherein the terrain data is weighted based on the order of priority of criteria of the mission including for the one or more ground vehicles, multiple ones of traversability, speed, fuel efficiency, covertness, or wireless communication range.

* * * * *

UNITED STATES PATENT AND TRADEMARK OFFICE
CERTIFICATE OF CORRECTION

PATENT NO. : 12,078,507 B2
APPLICATION NO. : 17/454632
DATED : September 3, 2024
INVENTOR(S) : Kalani A. Armstrong and Andrew P. Lancaster Page 1 of 1

It is certified that error appears in the above-identified patent and that said Letters Patent is hereby corrected as shown below:

On the Title Page

The item [71], Applicant: "Insitu, Inc." should read --Insitu, Inc., a subsidiary of The Boeing Company--.

The item [73], Assignee: "Insitu, Inc." should read --Insitu, Inc., a subsidiary of The Boeing Company--.

Signed and Sealed this
Tenth Day of December, 2024

Katherine Kelly Vidal
*Director of the United States Patent and Trademark Office*